US012737383B2

(12) United States Patent
Atwal et al.

(10) Patent No.: US 12,737,383 B2
(45) Date of Patent: Sep. 15, 2026

(54) PLUGGABLE REPLICATION FRAMEWORK

(71) Applicant: Snowflake Inc., Bozeman, MT (US)

(72) Inventors: Harminter Singh Atwal, Bothell, WA (US); Loc Duc Bui, Bellevue, WA (US); Hitesh Madan, Seattle, WA (US); Nithin Mahesh, Kirkland, WA (US); Siddarth Ramadoss, Kirkland, WA (US); Subramanian Sankara Subramanian, Mercer Island, WA (US); Batuhan Tasdoven, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/990,942

(22) Filed: Dec. 20, 2024

(65) Prior Publication Data

US 2026/0178610 A1 Jun. 25, 2026

(51) Int. Cl.
*G06F 16/27* (2019.01)

(52) U.S. Cl.
CPC .................................... *G06F 16/27* (2019.01)

(58) Field of Classification Search
CPC ........................................................ G06F 16/27
See application file for complete search history.

(56) References Cited

U.S. PATENT DOCUMENTS 11,481,440 B2 * 10/2022 Yurchenko .......... G06F 16/9024
2012/0079502 A1 * 3/2012 Kwan ...................... G06F 8/71 718/106
2015/0269215 A1 * 9/2015 Lehouillier ......... G06F 16/2358 707/626
2017/0277437 A1 * 9/2017 Jones .................... G06F 16/178
2017/0288940 A1 * 10/2017 Lagos ................. H04L 41/0266
2018/0144038 A1 * 5/2018 Newhouse .......... G06F 16/2365
2022/0066996 A1 * 3/2022 Efimov ................... G06F 3/065
2023/0087447 A1 * 3/2023 Li ......................... G06F 16/214 707/611
2023/0185825 A1 * 6/2023 Gernhardt ............ G06F 16/185 707/613
2025/0036661 A1 * 1/2025 Wu ........................ G06Q 10/10

OTHER PUBLICATIONS

Wikipedia, "Solid", [Online]. Retrieved from the Internet: <https://web.archive.org/web/20241016023137/https://en.wikipedia.org/wiki/SOLID>, (Wayback Machine snapshot Oct. 16, 2024), 2 pages.

* cited by examiner

*Primary Examiner* — Khanh B Pham
(74) *Attorney, Agent, or Firm* — Schwegman Lundberg & Woessner, P.A.

(57) ABSTRACT

A replication engine is provided that receives a set of interface implementations from features in a distributed data platform, where each interface implementation provides replication constraints. The replication engine constructs a dependency graph based on relationships between the features using the replication constraints and determines a synchronization order for replication operations using the dependency graph. The replication engine executes the replication operations according to the determined synchronization order by coordinating between multiple handlers including a snapshot handler for primary-side operations, an association handler for managing cross-cutting relationships, and a synchronization handler for secondary-side operations.

20 Claims, 8 Drawing Sheets

PLUGGABLE REPLICATION FRAMEWORK

TECHNICAL FIELD

Examples of the disclosure relate generally to data platforms and, more specifically, to database replication.

BACKGROUND

Data platforms are widely used for data storage and data access in computing and communication contexts. With respect to architecture, a data platform can be an on-premises data platform, a network-based data platform (e.g., a cloud-based data platform), a combination of the two, and/or include another type of architecture. With respect to type of data processing, a data platform can implement online transactional processing (OLTP), online analytical processing (OLAP), a combination of the two, and/or another type of data processing. Moreover, a data platform can be or include a relational database management system (RDBMS) and/or one or more other types of database management systems. Cloud-based data platforms may communicate data between databases.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
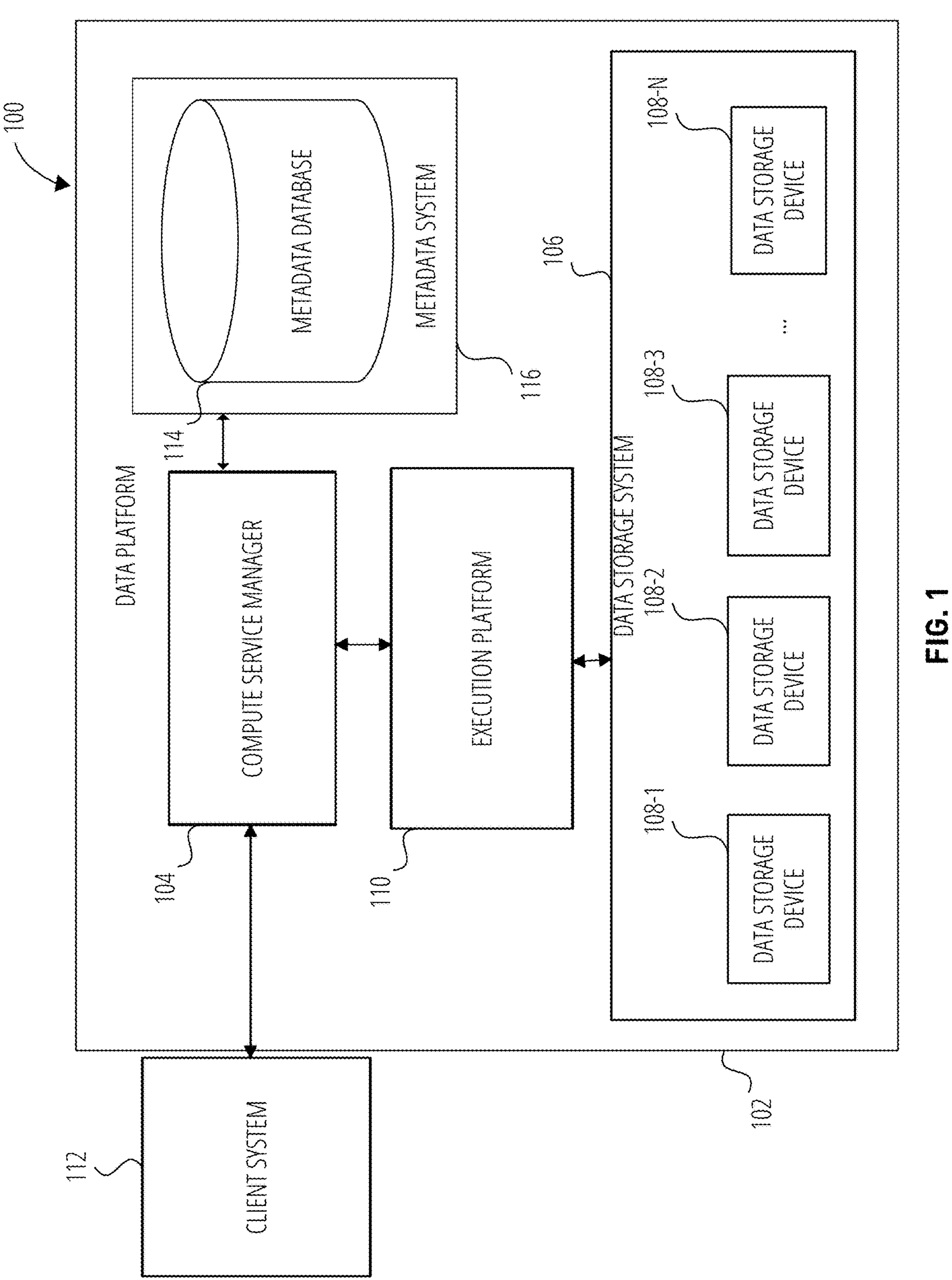
FIG. 1 illustrates an example computing environment that includes a network-based data platform in communication with a cloud storage provider user system, according to some examples.

Data platforms are widely used for data storage and data access in computing and communication contexts. These platforms can have various architectures, including on-premises, network-based (e.g., cloud-based), or a combination of both. They can implement different types of data processing, such as online transactional processing (OLTP), online analytical processing (OLAP), or a combination of these. Data platforms often include relational database management systems (RDBMS) and may communicate data between databases. However, as data volumes grow and queries become more complex, replication of databases becomes increasingly challenging.

Data platform replication systems face significant challenges in managing complex dependencies between features during replication operations. Some existing approaches require manual management of synchronization ordering across numerous interconnected entities, which becomes increasingly difficult as the number of features grows. With increasing numbers of features that need to be replicated between accounts, the dependency relationships form a complex directed graph that is challenging to manage manually.

Some current solutions demand significant domain expertise in replication from feature teams, resulting in extended engineering timelines and delays for customers seeking business continuity and disaster recovery options. Feature teams specifically determine the exact synchronization order before and after different objects, which is both difficult to implement and maintain over time.

Resource management presents additional challenges, particularly when dealing with memory constraints. Some current approaches include keeping entities in memory during synchronization, which becomes problematic as the number of entities grows. Without efficient batching mechanisms for metadata store access when dealing with millions of tables or other scaled elements can hamper operations of a replication system.

These technical limitations create significant barriers to implementing efficient and reliable replication across the distributed data platform, impacting both development productivity and system performance.

The examples described in this disclosure provide a pluggable replication framework including a replication engine that transforms complex manual replication processes into an automated, efficient system. The replication engine automatically constructs dependency graphs between features by requiring each feature to implement standardized interfaces that provide necessary metadata information. This allows the replication engine to determine correct synchronization ordering through topological sorting algorithms while optimizing resource usage through intelligent batching mechanisms that dynamically adjust based on system constraints. The replication engine employs specialized handlers for snapshot operations, association management, and synchronization, enabling clear separation of concerns and reducing the expertise required from feature teams. Through automated dependency management and sophisticated parameter negotiation between primary and secondary systems, the replication engine ensures reliable replication behavior while maintaining proper entity relationships across the distributed data platform. This comprehensive solution addresses the challenges of manual dependency management, resource optimization, and code maintainability while providing a scalable architecture that can automatically handle complex replication scenarios.

In some examples, a replication engine receives a set of interface implementations from a set of features in a distributed data platform that provide a set of replication constraints. The replication engine constructs a dependency graph based on relationships between the set of features using the set of replication constraints and determines a synchronization order for a set of replication operations using the dependency graph. The replication engine executes the set of replication operations according to the determined synchronization order.

In some examples, the interface implementation of the set of interface implementations include a set of entity type definitions and a set of dependency declarations.

In some examples, the replication engine constructs the dependency graph by identifying a set of parent-child relationships and detecting a set of nested relationships.

In some examples, the replication engine identifies a set of dependencies declared in the set of interface implementations and detects a set of circular dependencies between the set of features using the set of dependencies. The replication engine resolves the set of circular dependencies by breaking each circular dependency into a set of initialization passes, initializing a set of dependent entities of the circular dependency to generate a set of initialized dependent entities, and establishing a set of links between the set of initialized dependent entities.

In some examples, the replication engine executes a replication operation by capturing snapshot data through a snapshot handler, managing cross-cutting relationships through an association handler, and controlling synchronization through a synchronization handler.

In some examples, capturing snapshot data includes identifying objects requiring synchronization and managing state transitions during the capturing of the snapshot data.

In some examples, the replication engine negotiates a set of parameters between a primary system and a set of secondary systems and validates feature configurations using the set of parameters.

In some examples, the replication engine tracks replication metrics and validates replication completion using the replication metrics.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client system 112, according to some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage system 106, a compute service manager 104, an execution platform 110, and a metadata system 116. The data storage system 106 comprises a plurality of computing machines and provides on-demand computer system resources such as data storage and computing power to the data platform 102. As shown, the data storage system 106 comprises multiple data storage devices, such as data storage device 108-1, data storage device 108-2, data storage device 108-3, and data storage device 108-N. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage system 106 may include distributed file systems (e.g., Hadoop Distributed File Systems (HDFS)), object storage systems, and the like.

In some examples, one or more of the data storage devices 108-1 to 108-N are cloud-based datastores configured as Virtual Private Clouds (VPCs). In some examples, a VPC is a secure, isolated virtual network within a public cloud environment that allows organizations to run and manage their cloud resources with enhanced control and privacy. A VPC can provide the functionality of a traditional data center without the physical management and maintenance overhead, enabling users to define their own network space. This includes selecting IP address ranges, creating subnets, configuring route tables, and setting up network gateways. VPCs are beneficial for entities that desire a partitioned section of the cloud to ensure that their applications and data are isolated from other users on the same public cloud platform. This isolation helps in maintaining security and compliance with regulatory requirements, while also allowing for scalable and flexible resource management.

In some examples, data objects are stored in structured data files. The structured data files can be in various structured file formats such as, but not limited to, Comma-Separated Values (CSV) JavaScript Object Notation (JSON), Apache Avro (Avro), Apache Parquet (Parquet) Optimized Row Columnar (ORC), Extensible Markup Language (XML), and the like.

In some examples, the data platform 102 organizes data storage using micro-partitions of a database table using a suitable structured data file format specifically designed for optimal performance and security within the computing environment 100 such as, but not limited to, Flocon De Neige (FDN) and the like. Whenever new data is added to a table, new micro-partition files are created. This approach ensures that data is stored in an immutable format where the addition of a new record results in the generation of a new micro-partition file.

The data platform 102 is used for reporting and analysis of integrated data from one or more disparate sources including the storage devices 1 to N within the data storage system 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage system 106. Moreover, the data platform 102 may maintain metadata associated with the consumer accounts in the metadata database 114 of the metadata system 116. Each consumer account includes multiple objects with examples including users, roles, privileges, a datastores or other data locations.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client system 112. The client system 112 can be used by a user of one of the multiple consumer accounts supported by the data platform 102 to interact with and utilize the functionality of the data platform 102.

In some examples, the compute service manager 104 does not receive any direct communications from the client system 112 and only receives communications concerning jobs from a queue within the data platform 102.

The compute service manager 104 is also coupled to metadata system 116. The metadata system 116 includes a metadata database 114 that stores metadata pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the data storage system 106) and the local caches. In some examples, the metadata database 114 include data of metrics describing usage and access by provider users and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the data storage system 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 108-1 to data storage device 108-N are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata system 116, execution platform 110, and data storage system 106 are shown in FIG. 1 as individual discrete components. However, each of the compute service manager 104, metadata system 116, execution platform 110, and data storage system 106 may be implemented as a distributed system (e.g., distributed across multiple systems/platforms at multiple geographic locations). Additionally, each of the compute service manager 104, metadata system 116, execution platform 110, and data storage system 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage system 106. It is desirable to retrieve as much data as possible from caches within the execution platform 110 because the retrieval speed is typically faster than retrieving data from the data storage system 106.

As shown in FIG. 1, the computing environment 100 separates the execution platform 110 from the data storage system 106. In this arrangement, the processing resources and cache resources in the execution platform 110 operate independently of the database storage devices data storage device 108-1 to data storage device 108-N in the data storage system 106. Thus, the computing resources and cache resources are not restricted to a specific one of the data storage device 108-1 to data storage device 108-N. Instead, computing resources and cache resources may retrieve data from, and store data to, any of the data storage resources in the data storage system 106.

Figure 2:
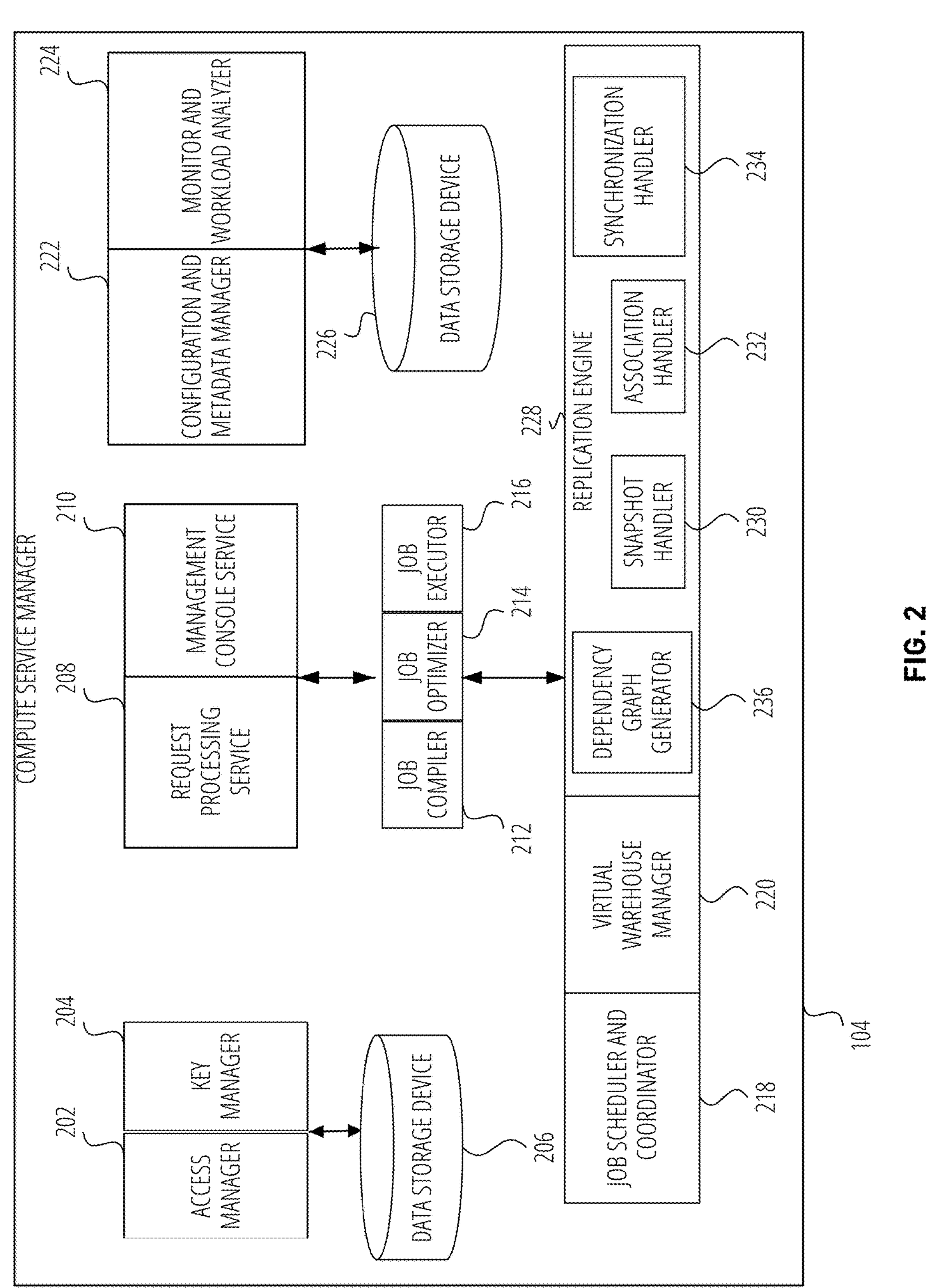
FIG. 2 is a block diagram illustrating components of a compute service manager, according to some examples.

FIG. 2 is a block diagram illustrating components of the compute service manager 104, according to some examples. As shown in FIG. 2, the compute service manager 104 includes an access manager 202, and a key manager 204. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage data storage device 206). As used herein, the remote storage devices may also be referred to as "persistent storage devices" or "shared storage devices."

In some examples, the access manager 202 operates within a data platform to control access to various objects of the data platform using Role-Based Access Control (RBAC). The access manager 202 is a component that manages authentication and authorization tasks, providing for authorized entities to access specific resources within the data platform. This component plays a role in maintaining the security and integrity of the data platform by enforcing access policies defined through RBAC.

In some examples, RBAC is implemented by defining roles within the data platform, where each role is associated with a specific set of permissions. These permissions determine the actions that entities assigned to the role can perform on various objects within the data platform. The access manager 202 utilizes these roles to make access control decisions, allowing or denying requests based on the roles assigned to the requesting entity and the permissions associated with those roles.

In some examples, the data platform creates specific access roles based on a manifest of an application received from an application package. These access roles are activated by the access manager 202 and are used to govern access to objects used by the application during operation. For example, an access role may grant the application the ability to create a compute pool and execute a service within that compute pool. The access manager 202 provides that an application, or entities authorized by the application, can perform actions permitted by the access role.

In some examples, the access manager 202 also controls access to objects of the data platform using the access roles during the execution of the service within the compute pool. The service accesses objects of the application package and of the data platform under the governance of the activated access roles. The access manager 202 checks the permissions associated with the access roles against the access requests made by the service, granting or denying these requests based on the defined RBAC policies.

In some examples, the role of the access manager 202 extends to managing access to hidden repositories within a provider account, where the application package is stored. The access manager 202 uses RBAC to restrict access to a hidden repository, providing for the application package to be accessible to entities with the appropriate access role. This mechanism protects the application package from unauthorized access, preserving the integrity of the provider's intellectual property.

In some examples, the access manager 202 implements RBAC to isolate the compute pool, preventing the service from accessing other services or resources not specified in the application package. This isolation is achieved by defining access roles that explicitly limit the service's permissions to the resources provided for the operation of the service, thereby enhancing the security of the service execution environment.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage system 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job.

The job executor 216 is a component of the compute service manager 104 that executes the execution code for jobs received from a queue or determined by the compute service manager. It works in conjunction with other components like the job compiler 212 and job optimizer 214 to process jobs within the data platform. The job executor 216 is responsible for carrying out the actual execution of compiled and optimized jobs, utilizing the resources of the execution platform 110 to perform data storage and retrieval tasks.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage system 106, or any other storage device.

The compute service manager 104 validates communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node of the execution platform 110 may need to communicate with another execution node, and should be disallowed from communicating with a third execution node and any such illicit communication can be recorded (e.g., in a log or other location). Also, the information stored on a given execution node is restricted to data relevant to the current query and any other data is unusable, rendered so by destruction or encryption where the key is unavailable.

In some examples, the compute service manager 104 includes a replication engine 228 used to perform replication of objects within the data platform. The replication engine 228 coordinates the end-to-end replication process across distributed database systems.

In some examples, the replication engine 228 can include a dependency graph generator 236. The dependency graph generator 236 constructs a dependency graph to enable proper ordering during replication while supporting parallel processing of independent entities. The dependency graph generator 236 coordinates with a snapshot handler 230 and a synchronization handler 234 to maintain consistency between primary and secondary systems during the replication process. In some examples, the dependency graph generator 236 processes metadata about entity relationships to construct a dependency graph representing how different features interact and depend on each other. The dependency graph generator 236 analyzes relationships between features to determine parent-child hierarchies, nested relationships, and associated entity relationships. In some examples, the dependency graph generator 236 identifies parent-child relationships and detects nested relationships between features. It validates that all relationship types are properly declared in the interface implementations and detects any circular dependencies between features using the set of dependencies. In some examples, the dependency graph generator 236 examines cross-entity dependencies that most features have, evaluates the order in which entities should be created or updated relative to their dependencies, and handles cases of cyclic dependencies between domains by breaking them into multiple initialization passes. For cyclic dependencies, the dependency graph generator 236 breaks the dependency into initialization passes where it first initializes the dependent objects and then establishes the connections between them. The operations of the dependency graph generator 236 are described more fully in reference to FIG. 3A.

In some examples, the replication engine 228 can include a snapshot handler 230. The snapshot handler 230 controls entity snapshotting operations on primary systems during replication. In some examples, the snapshot handler 230 validates and filters entities by determining whether specific entities should be included in the snapshot through and controls whether an entity's children should be visited during snapshotting through. In some examples, for associated entity management, the snapshot handler 230 returns lists of associated entities that need to be captured alongside the primary entity, handles different types of associated entities including tags, policies, and grants, and enables batched discovery of associated entities across multiple primary entities. In some examples, the snapshot handler 230 manages relationship tracking by maintaining information about cross-entity references, tracking relationships for enforcing dangling reference validations between primary and secondary systems, and handling nested relationships and parent-child hierarchies. In some examples, for snapshot generation, the snapshot handler 230 performs a custom serialization methods allowing the snapshot handler 230 to implement custom serialization for specific entity types, and supports two-pass snapshotting behavior when needed. In some examples, the snapshot handler 230 maintains metrics tracking by updating metrics for each entity visited during the snapshot process and maintaining metrics about the snapshot operation. In some examples, the snapshot handler 230 coordinates with association snapshot handlers to manage horizontal features spanning multiple entities, including handling tag mappings, policy mappings, and grants in a batched manner to optimize performance. In some examples, the snapshot handler 230 maintains cached information to minimize repeated tree traversals and supports both database-scoped and account-scoped entities through separate snapshot writing methods. The operations of the snapshot handler 230 are more fully described in reference to FIG. 3A.

In some examples, the replication engine 228 can include an association handler 232. The association handler 232 manages horizontal, cross-cutting features that span multiple entities during replication. The handler processes associated entities like tag mappings, policy mappings, and grants through several functions. In some examples, the association handler 232 enables batched discovery of associated entities across multiple primary entities, optimizing performance by reducing database operations. Rather than looking up tag mappings per table individually, the association handler 232 performs batched lookups for all tag mappings across multiple tables. For snapshot operations, the association handler 232 transforms batches of primary entities into corresponding batches of associated entities. The association handler 232 coordinates snapshotting of associated entities in the context of their anchor entities, such as capturing grant records in relation to the entities they apply to. In some examples, the association handler 232 implements specialized interfaces for different types of associated entities, including tag mappings, policy mappings, grant relationships, and parameters. This allows the association handler 232 to manage the unique constraints of each association type while maintaining consistency. In some examples, during a synchronization, the association handler 232 coordinates the processing of associated entities to maintain proper ordering and dependencies. The association handler 232 ensures associated entities are synchronized after their primary entities are established but before dependent relationships are created. In some examples, the association handler 232 supports two-pass processing when needed, allowing for initialization of basic attributes before establishing cross-entity relationships. This enables proper handling of circular dependencies between associated entities. In some examples, the association handler 232 manages state transitions during snapshot capture and provides validation of entity relationships during synchronization. The association handler 232 coordinates with snapshot handlers and synchronization handlers to maintain consistency across complex relationship structures. The operations of the association handler 232 are more fully described in reference to FIG. 3A.

In some examples, the replication engine 228 can include a synchronization handler 234. The synchronization handler 234 functions as a component that controls how entities are synchronized on secondary systems during replication. The synchronization handler 234 implements several operations. In some examples, the synchronization handler 234 manages domain-level operations by specifying which domain the synchronization handler 234 handles and determining whether features like renames and creates are supported for that domain. The synchronization handler 234 validates that no unprocessed entities remain in a snapshot after synchronization completes. For entity management, the synchronization handler 234 returns lists of local entities for provided parents, enabling batched retrieval across multiple parents to reduce database operations. The synchronization handler 234 supports both parent-child relationships and nested container relationships without requiring strict hierarchical dependencies. In some examples, the synchronization handler 234 coordinates initialization and relationship establishment by implementing initial bookkeeping before a first synchronization of an entity, parameter validation before each synchronization, and an entity-specific setup before each creation of an entity. In some examples, the synchronization handler 234 manages state transitions during synchronization and validates entity relationships. In some examples, for reference management, the synchronization handler 234 processes delayed references as a final synchronization pass, maintaining proper ordering when establishing connections between entities. The synchronization handler 234 supports reference synchronization by managing entity creation order and validating relationships. In some examples, the handler implements cleanup operations after a last synchronization to clear memory footprints in a snapshot reader after entities are processed. The synchronization handler 234 coordinates with snapshot handlers to maintain consistency between primary and secondary systems. In some examples, the synchronization handler 234 manages both database-scoped and account-scoped entities, supporting different synchronization constraints for each scope while maintaining proper dependency ordering during a synchronization process. The operations of the synchronization handler 234 are more fully described in reference to FIG. 3A.

Figure 3A:
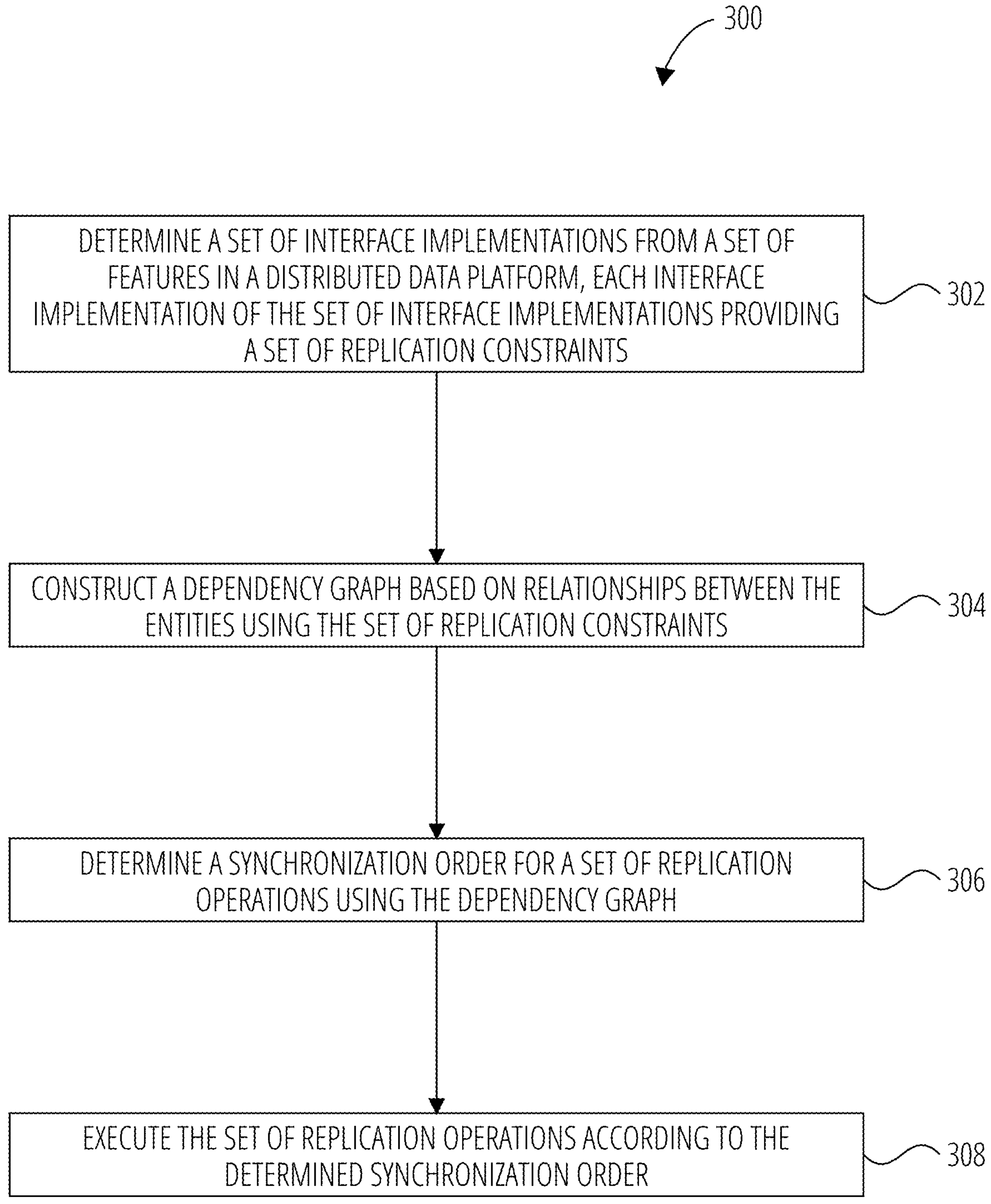
FIG. 3A illustrates a replication method, according to some examples.
Figure 3B:
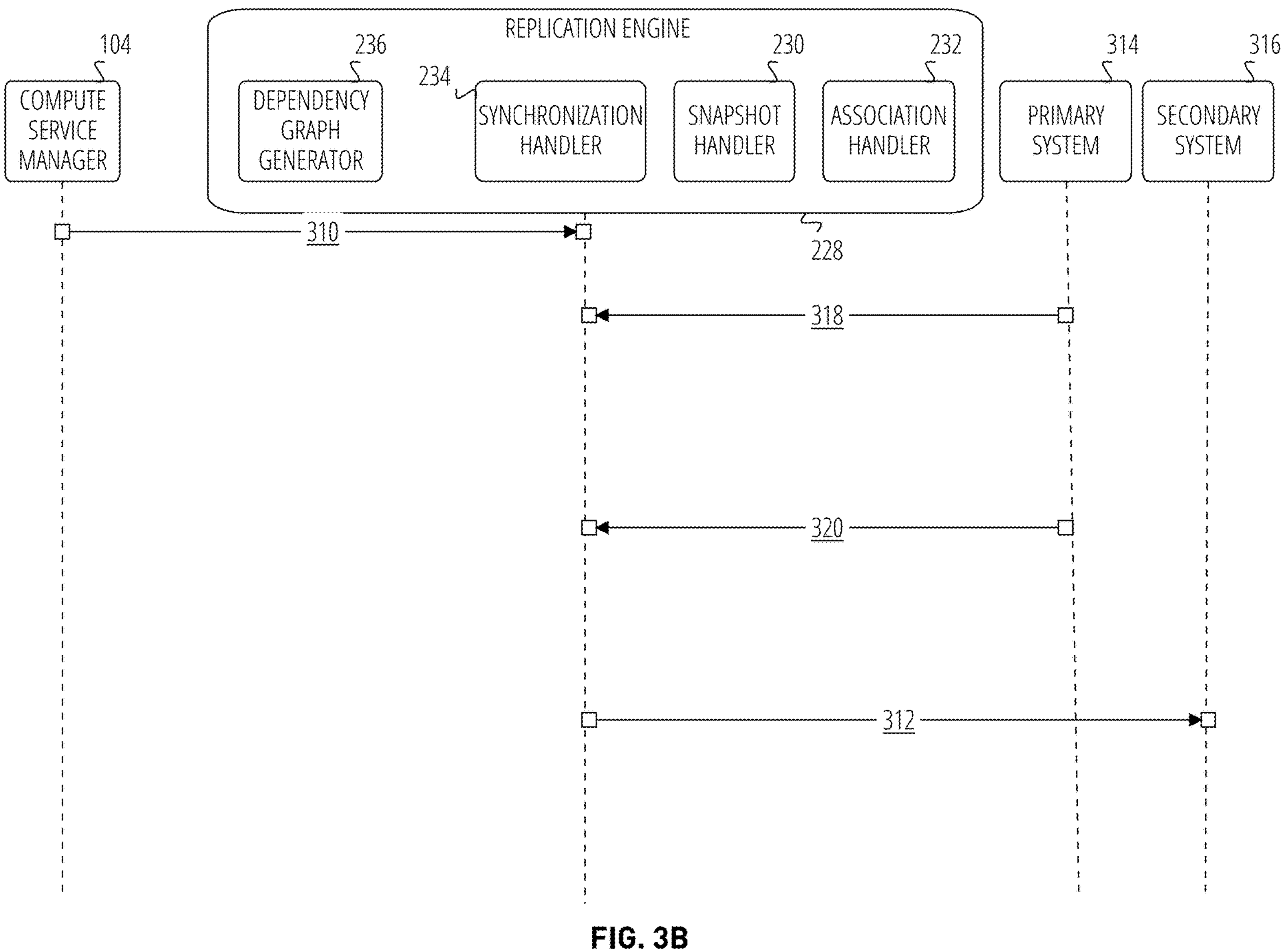
FIG. 3B illustrates a sequence diagram of a replication method, according to some examples.

FIG. 3A illustrates a replication method 300 for replicating an entity within a data platform and FIG. 3B illustrates a sequence of operations of the replication method 300, according to some examples. Although the example replication method 300 depicts a particular sequence of operations, the sequence may be altered without departing from the scope of the present disclosure. For example, some of the operations depicted may be performed in parallel or in a different sequence that does not materially affect the function of the replication method 300. In other examples, different components of a data platform, such as compute service manager 104 of (FIG. 1) or a replication engine 228 of (FIG. 2), that implement the replication method 300 may perform functions at substantially the same time or in a specific sequence.

The replication method 300 is functional to replicate one or more domains within a data platform. Domains are different types of features or entities within the data platform that can be replicated. Domains can include, but are not limited to, entities such as databases, schemas, tables, roles, users, warehouses, network policies, integrations, and other features that customers can create within their data platform accounts. Each domain represents a distinct type of object with its own replication behavior and semantics. For example, some domains are account-scoped (like roles and users) while others are database-scoped (like schemas) or schema-scoped (like tables and views).

Features represent high-level functional components or services within the data platform that need replication support. Each developer team of a feature implements interfaces to specify how their feature should be replicated. Features provide the replication constraints and implementation details through interface implementations. Entities are the specific objects or data structures that exist within features and need to be replicated. For example, databases, schemas, tables, roles, users, and other objects are entities.

An entity belongs to a domain (feature), and each domain can have multiple entity types. For instance, within a database feature, there can be multiple entity types like tables, columns, and constraints. The replication framework uses this hierarchy where features provide the implementation interfaces, while entities are the actual objects being replicated according to those implementations.

In some examples, entities include, but are not limited to:

Account-Scoped Entities:
- SHARE
- DATABASE
- APPLICATION_PACKAGE
- ROLE
- USER
- WAREHOUSE
- NETWORK_POLICY
- INTEGRATION Database-Scoped Entities:
- SCHEMA
- DB_ROLE Schema-Scoped Entities:
- FILE_FORMAT
- FUNCTION
- SEQUENCE
- STAGE
- PIPE
- USER_TASK
- ALERT
- POLICY
- TAG
- BUNDLE
- SECRET
- STREAM
- DIRECTORY_TABLE
- DYNAMIC_TABLE
- EXTERNAL_TABLE
- ICEBERG_TABLE
- KV_TABLE
- MIXED_TABLE
- TABLE_OTHERS
- VIEW Table-Scoped Entities:
- COLUMN
- CONSTRAINT In some examples, the features implement interfaces that specify their replication behavior. For example, the interfaces specify how different entities should be handled during replication. Each feature implements these interfaces to define what set of entities will be handled, what other entity types are dependencies, and expose handlers for snapshot and synchronization operations. In some examples, a replication engine 228 processes interface implementations that provide metadata about entity relationships and dependencies that must be maintained during replication. The interfaces define entity type definitions and dependency declarations, where entity type definitions specify what kinds of entities will be handled, such as databases, schemas, tables, roles, users, warehouses, network policies, and integrations. In additional examples, the interface implementations determine how different features handle replication through specialized handlers. A snapshot handler 230 manages primary-side operations, an association handler 232 manages relationships between entities, and a synchronization handler 234 manages secondary-side operations. Each feature implements these interfaces to specify their unique replication constraints while maintaining consistency with the overall replication process.

In operation 302, a replication engine 228 determines a set of interface implementations from a set of features of the data platform. For example, as shown in FIG. 3B, a compute service manager 104 communicates a replication request 310 to a replication engine 228. The replication request 310 includes an identification of a set of entities of a feature or domain that are located on a primary system 314 and are to be replicated to a secondary system 316. In response to the replication request 310, the replication engine 228 determines a set of interface implementations 318 of the entities that are to be replicated from the primary system 314 to the secondary system 316. Each interface implementation of the set of interface implementations 318 provides metadata of the entities including a set of replication constraints. The interface implementations specify how different entities of the features or domains are to be handled during replication.

In some examples, each interface implementation of the set of interface implementations 318 provides metadata about entity relationships and dependencies to be maintained during replication. The set of interface implementations 318 define what set of entities will be handled, what other entity types are dependencies, and expose handlers for snapshot and synchronization operations. For example, the replication engine 228 uses replicated entity type definitions and groupings to provide more granular control over replication behavior within domains. In some examples, while entities share the same domain, they can exhibit different replication constraints, so each entity implements its own replicated entity type based on the entity's specific properties and replication constraints.

In some examples, the replication engine 228 implements a replication descriptor for each replicated entity type to define the replication behavior and memory constraints for entities of that type. In some examples, the replication descriptor includes information for replicating an entity, including metadata about dependencies, parent-child relationships, and customization hooks that allow features to specify their unique replication constraints.

In some examples, the set of interface implementations provides replication constraints including replicated entity type definitions and dependency declarations. For example, the replicated entity type definitions specify what kinds of entities will be handled by a feature, such as databases, schemas, tables, roles, users, warehouses, network policies, integrations and other features that customers can create within their data platform accounts. Each domain represents a distinct type of object with its own replication behavior and semantics. In some examples, the dependency declarations define what other entity types are dependencies, expose handlers for snapshot and synchronization operations, and provide metadata about entity relationships to be maintained during replication. The dependency declarations specify how different features handle replication and define what set of entities will be handled. In additional examples, the dependency declarations include information about parent-child hierarchies, nested relationships, and associated entity relationships. The dependency declarations allow the replication engine 228 to determine the proper ordering during replication by evaluating cross-entity dependencies, determining the order in which entities should be created or updated relative to their dependencies, and handling cases of cyclic dependencies between domains by breaking them into multiple initialization passes.

In some examples, the replication engine 228 handles different replication behaviors within the same domain by implementing specialized entity types and replication descriptors. For example, named storage locations that are regular children of schemas can require synchronization after their parent schemas and dependent entities like tags and policies are synchronized, since these named storage locations can have tags and policies applied to them and are managed by customers. In additional examples, named storage locations that are nested under notebooks, while sharing the same domain notebook classification, follow a different synchronization path-they do not have tags or policies applied, are invisible to customers, follow their container entity's lifecycle, and have additional properties specific to being nested entities to be synchronized after their container dependencies. The replication engine 228 can manage these distinct behaviors by using replicated entity type definitions that allow each entity to specify unique replication constraints and dependencies while maintaining proper synchronization ordering.

In some examples, the replication engine 228 uses replicated entity types to handle different replication behaviors within the same domain. For instance, if entities are dynamic tables with a special format (e.g., Iceberg or the like), they are grouped with a replicated entity type such as ReplicatedEntityType.DYNAMIC_ICEBERG_TABLE, while event tables may use ReplicatedEntityType.EVENT_TABLE. This allows the replication engine 228 to handle differences in replication behavior compared to other table entities.

In additional examples, the replication engine 228 uses separate snapshot files for each replicated entity type group. For example, a DYNAMIC_ICEBERG_TABLE.snapshot for a first table in a domain, an EVENT_TABLE.snapshot for a second table and a third table, and a SCHEMA.snapshot for a first schema and a second schema. This grouping enables a secondary side of a replication process to process all entities that were snapshotted in that group while maintaining proper dependency ordering.

In some examples, the replication engine 228 implements specialized replicated entity types and replication descriptors for schemas and nested schemas. For example, regular schemas are synchronized before bundle instances since bundle instances are children of schemas, while nested schemas are to be synchronized after bundle instances since bundle instances act as their containers. This may create a complex synchronization constraints where some entities under a domain schema are to be processed before bundle instances while others are to be processed after, requiring the replication engine 228 to manage these dependencies through replicated entity type definitions that specify the unique replication constraints and dependencies for each schema type. The replication engine 228 resolves these timing dependencies by using separate snapshot files for regular schemas versus nested schemas under bundle instances, allowing a secondary system to process these different types of schemas separately according to their specific dependency constraints.

In operation 304, the compute service manager 104 uses a dependency graph generator 236 of FIG. 2 to construct a dependency graph based on relationships between the entities of the set of features or domains as defined by the set of interface implementations 318. The dependency graph generator 236 processes metadata of the set of interface implementations 318 about entity relationships to construct a dependency graph representing how different entities interact and depend on each other. The dependency graph generator 236 analyzes the relationships between entities to determine parent-child hierarchies, nested relationships, and associated entity relationships.

Figure 4A:
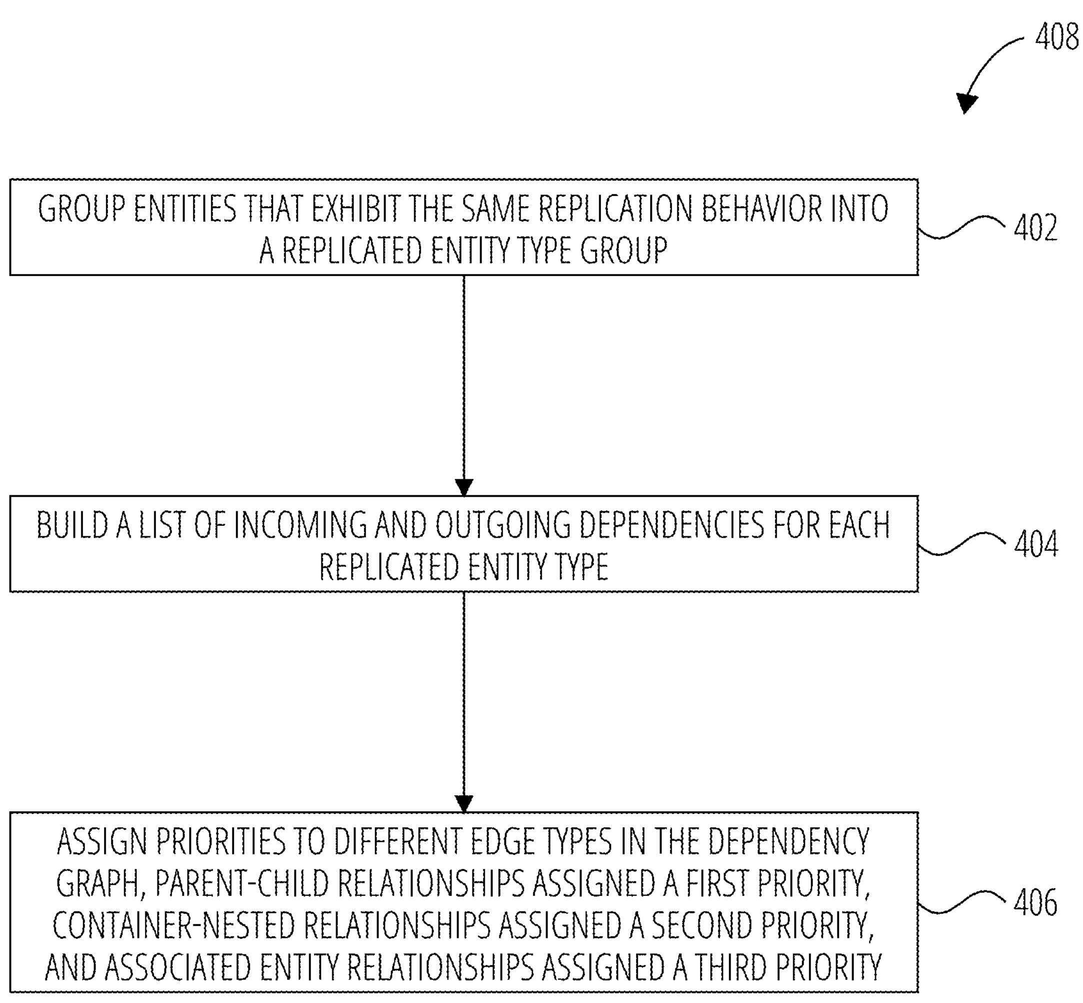
FIG. 4A illustrates a dependency graph generation method 408, according to some examples.
Figure 4B:
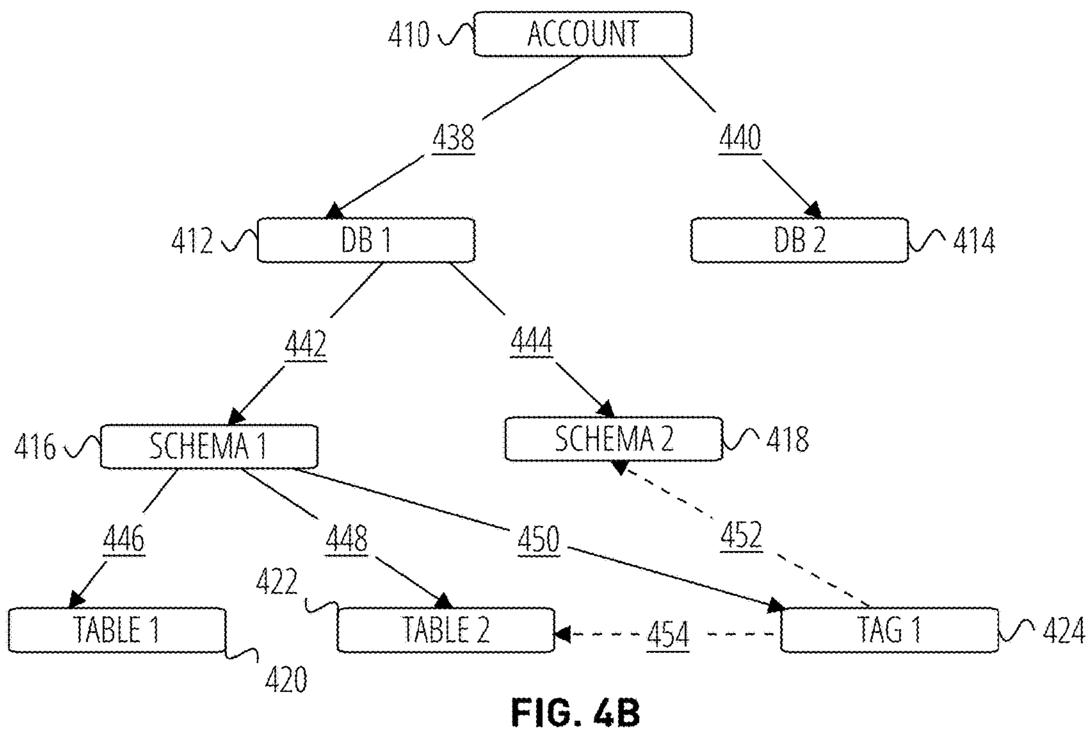
FIG. 4B, FIG. 4C, and FIG. 4D illustrate example intermediate data structures during a dependency graph generation process, according to some examples.
Figure 4C:
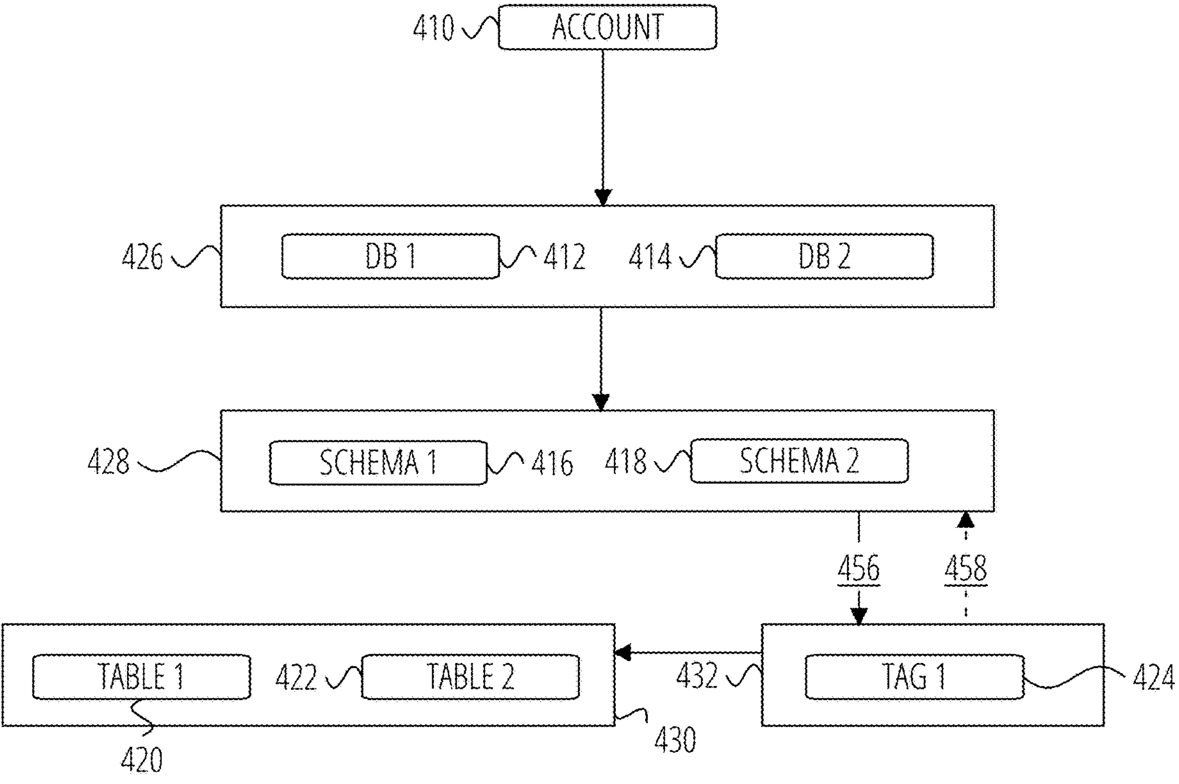
Figure 4D:
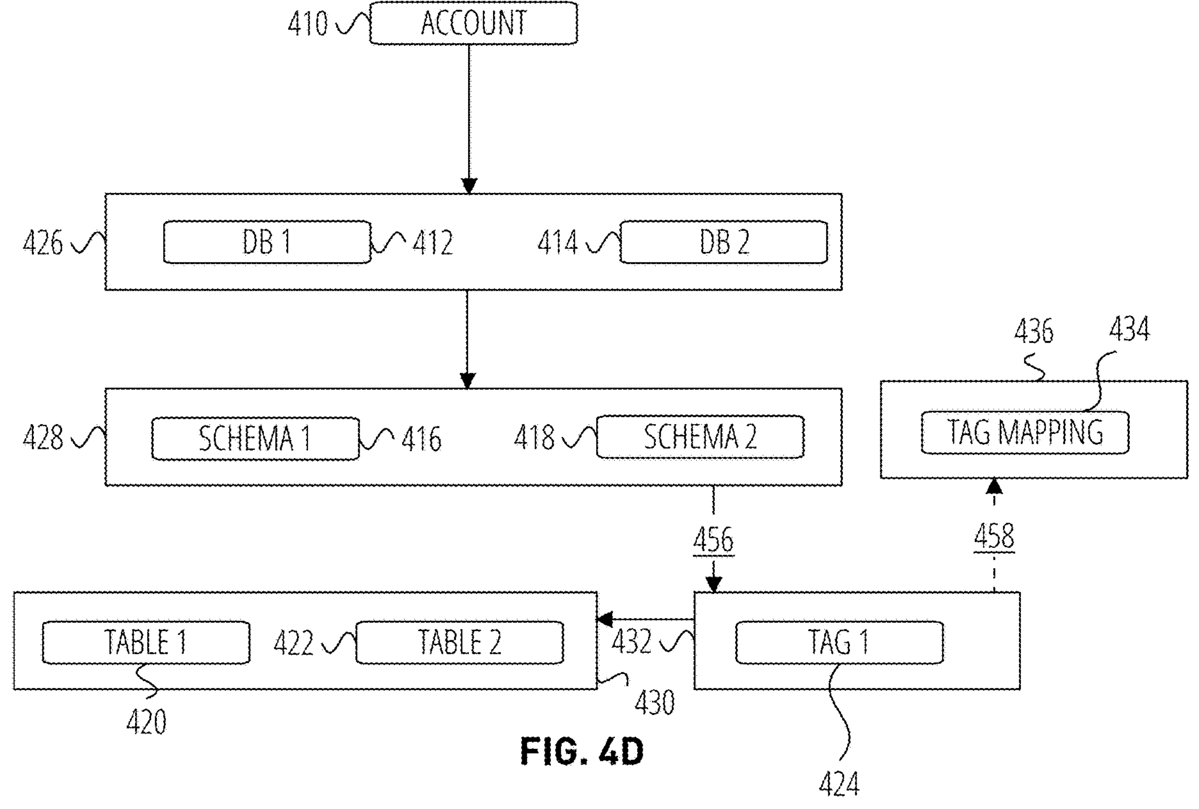

For example, FIG. 4A illustrates a dependency graph generation method 408 for generating a dependency graphs, and FIG. 4B, FIG. 4C, and FIG. 4D illustrate example intermediate data structures during the dependency graph generation process, according to some examples. Although the example dependency graph generation method 408 depicts a particular sequence of operations, the sequence may be altered without departing from the scope of the present disclosure. For example, some of the operations depicted may be performed in parallel or in a different sequence that does not materially affect the function of the dependency graph generation method 408. In other examples, different components of replication engine 228 (of FIG. 2) that implements the dependency graph generation method 408 may perform functions at substantially the same time or in a specific sequence.

In operation 402, the replication engine 228 groups entities that exhibit the same replication behavior by replicated entity types. For example, the replication engine 228 groups entities that exhibit similar replication behavior into replicated entity type groups to optimize processing. The replication engine 228 determines the replicated entity type for each entity based on the entity's properties and replication constraints.

In reference to FIG. 4B, an example directed graph for an account 410 is shown. Account 410 has parent-child dependencies, dependency 438 and dependency 440, on two databases, DB 1 412 and DB 2 414. DB 1 412 has parent-child dependencies, dependency 442 and dependency 444, on two schemas, Schema 1 416 and Schema 2 418. Schema 1 416 has parent-child dependencies, dependency 446 and dependency 448, with two tables, Table 1 420 and Table 2 422, as well as a parent-child dependency, dependency 450, with a Tag 1 424 entity. Tag 1 424 is in an associated dependency 454 with Table 2 422 and an associated dependency 452 with Schema 2 418.

In reference to FIG. 4C, the entities are shown in their respective replicated entity type groups. For example, DB 1 412 and DB 2 414 are grouped in a database replicated entity type group 426. In a like manner, Schema 1 416 and Schema 2 418 are grouped in a schema replicated entity type group 428. Table 1 420 and Table 2 422 are grouped in a table replicated entity type group 430. Tag 1 424 is in a tag replicated entity type group 432.

In some examples, entities under a given replicated entity type group share the same theoretical dependencies, even if not all instances have those dependencies activated. For example, when handling tables and tags, the replication engine 228 can assume tags are a dependency for all tables in the replicated entity type group, even if only some tables actually have tag associations. This assumption allows the replication engine 228 to group all tables together as a single replicated entity type in the dependency graph.

This grouping strategy simplifies the dependency graph by treating all entities of the same type as having uniform dependencies. Rather than processing separate individual entity dependencies, the replication engine 228 works with a smaller graph of replicated entity types. This optimization makes a topological sort algorithm more efficient by reducing the graph size while still maintaining proper dependency ordering.

In additional examples, the replication engine 228 uses this simplified dependency structure to enable parallel processing of entities within the same replicated entity type group. By assuming uniform dependencies at a type-level, the replication engine 228 can process multiple entities of the same type simultaneously once their type-level dependencies are satisfied, improving overall replication performance.

With returning reference to FIG. 4A, in operation 404, the replication engine 228 builds a list of incoming and outgoing dependencies for each replicated entity type. For example, the replication engine 228 builds the dependency graph by processing the set of dependencies declared by each replicated entity type through their replication descriptors. In some examples, the replication engine 228 examines both incoming dependencies (entities that the current type depends on) and outgoing dependencies (entities that depend on the current type) to establish the complete relationship structure between different entity types. In additional examples, the replication engine 228 processes these dependencies by evaluating parent-child relationships where one entity type is a parent of another, container-nested relationships where one entity contains another, and associated entity relationships like tag mappings and policy mappings that create cross-cutting dependencies between different entity types. The replication engine 228 uses this comprehensive dependency information to construct a directed graph that captures all relationships between replicated entity types, enabling proper ordering during the synchronization process.

In operation 406, the replication engine 228 assigns priorities to different edge types in the dependency graph. For example, the replication engine 228 assigns priorities to different types of edges in the dependency graph to enable proper ordering of replication operations. In some examples, the system assigns a first or highest priority to parent-child relationships, where one entity is a direct parent of another entity, such as the relationship between schemas and their child tables. In some examples, the replication engine 228 assigns a second or medium priority to container-nested relationships, where one entity acts as a container for another entity but isn't a direct parent, such as bundle instances containing nested schemas. In some examples, the replication engine 228 assigns a third or lowest priority to associated entity relationships like tag mappings and policy mappings that create cross-cutting dependencies between different entity types. This prioritization allows the system to resolve cyclic dependencies by delaying the processing of lower priority edges to subsequent processing steps while maintaining the integrity of critical parent-child relationships.

In some examples, the replication engine 228 handles cyclic dependencies between different entity types by implementing a delayed processing approach that breaks dependency cycles into multiple processing steps. For example, the replication engine 228 processes entities in a specific order-first synchronizing the base entities (e.g., schemas), then synchronizing the dependent entities (e.g., tags), and finally applying the relationships between them (e.g., tag mappings)—which breaks the cyclic dependency into distinct phases. In additional examples, the replication engine 228 represents these relationships as separate mapping entities that store the associations between entities, allowing the replication engine 228 to process the base entities and their relationships in separate phases while maintaining proper dependency ordering. The replication engine 228 uses this multi-phase approach to handle various types of cyclic dependencies that may arise as new features are added to the platform, ensuring that the topological sort algorithm can successfully determine a valid synchronization order without getting stuck in dependency cycles.

As an example, with returning reference to FIG. 4C, a cyclic dependency exists between schema replicated entity type group 428 and tag replicated entity type group 432. There is a parent-child dependency 456 between Schema 1 416 in schema replicated entity type group 428 and Tag 1 424 in tag replicated entity type group 432 and the association dependency 458 between Tag 1 424 and Schema 2 418 of schema replicated entity type group 428. This cyclic dependency can be broken using a tag dependency mapping. For example, in reference to FIG. 4D, a tag mapping 434 in special replicated entity type group 436 is used to delay processing the tag associations.

In operation 306, the replication engine 228 uses a synchronization handler 234 to perform a synchronization using a synchronization order determined by the structure of the dependency graph. For example, the synchronization handler 234 processes the dependency graph to establish a sequence of replication operations that maintains proper dependencies between entities.

The following is pseudo-code of a method for generating a synchronization order using the dependency graph:

```
// Returns the priority of the given ReplicatedEntityType v.
int calculatePriority(v) {
        if v has no incoming edges:
      // No incoming dependencies. Process this vertex right
away. Highest priority.
        return 0
        if v has only incoming edges of type EdgeType3:
      // EdgeType3 is association dependency. Defer these in the
cheapest way compared to other dependency types. So these get
the second highest priority.
        return 1
        if v has only incoming edges of type EdgeType2:
      // EdgeType2 is container entity -> nested entity
dependency. Defer this type of edge.
        return 2
    // v has only incoming edges of type EdgeType1. We cannot
defer these so they have the lowest priority.
    return 3
}
// G is the dependency graph where vertexes represent
Replicated Entity Types and edges represent the dependencies.
G = buildDependenciesGraph( )
// Q is a priority queue that use the CalculatePriority
function to decide which vertexes to dequeue first
Q = buildPriorityQueue(G.getVertexes( ))
while Q is not empty { v = Q.dequeue( );
// Process entities under Replicated Entity Type v
v.processEntities( );
// Now that v is visited, remove the dependencies from the
graph v.removeDependencies( )
// Recalculate the priorities and find the next set of
vertexes to process.
Q.update( );
}
```

In additional examples, the synchronization handler 234 coordinates with other components like the snapshot handler 230 and association handler 232 to maintain consistency between the primary system 314 and the secondary system 316 during replication. The synchronization handler 234 validates entity relationships, manages entity creation order, and ensures proper synchronization of both basic attributes and referential attributes that depend on other entities. In some examples, the synchronization handler 234 can parallelize synchronization of independent entities while maintaining sequential processing where dependencies exist.

With returned reference to FIG. 3A and FIG. 3B, in operation 308, the synchronization handler 234 executes the set of replication operations according to the determined synchronization order defined by the structure of the dependency graph to copy a set of entities 320 from the primary system 314 to the secondary system 316 as a set of replicated entities 312. For example, the synchronization handler 234 executes replication operations by coordinating between the snapshot handler 230 and the association handler 232 according to the determined synchronization order.

In some examples, the synchronization handler 234 processes entities in batches where possible while maintaining the dependency ordering. The synchronization handler 234 determines batch sizes for replication operations based on available system resources like memory and processing capacity. The synchronization handler 234 coordinates batched operations to optimize performance while respecting entity relationships and system resource constraints. For example, when processing entities in batches, the synchronization handler 234 groups together similar replicated entity types that can be processed simultaneously. The synchronization handler 234 can process multiple independent batches in parallel while still maintaining the ordering for dependent entities. In some examples, the number of entities in a batch are determined based on system constraints, such as API call limits that may restrict batch sizes to a specific number of entities that can be processed together. In some examples, the synchronization handler 234 dynamically adjusts batch sizes based on available computing resources and memory constraints. For example, a data platform may have enough resources to batch 100 items, while at another point it may only have enough resources to batch 10 items. The synchronization handler 234 determines these constraints dynamically to optimize the batching process.

In some examples, the synchronization handler 234 uses the snapshot handler 230 to capture a primary system state of the entities on the primary system 314 according to the ordering of the entities in the dependency graph to ensure consistent state capture. In some examples, the snapshot handler 230 captures both the basic attributes and referential attributes of entities while respecting their dependencies. This ensures that when entities are replicated, their state accurately reflects the relationships and dependencies that exist in the primary system 314. In additional examples, the snapshot handler 230 captures entity states in batches where possible to optimize performance while still maintaining the dependency ordering. In some examples, the snapshot handler 230 validates that all necessary entity state information is captured before proceeding with synchronization. This includes capturing both the entity attributes and their relationships to other entities to ensure proper replication of the complete entity state.

In some examples, the snapshot handler 230 validates that entity state information is captured before proceeding with synchronization. In additional examples, the snapshot handler 230 manages the staged initialization process for entities with circular dependencies by capturing basic attributes first, followed by referential attributes in subsequent passes.

In some examples, the replication engine 228 uses the association handler 232 to manage entity relationships between entities, and the synchronization handler 234 to apply changes on the secondary system. For example, the replication engine 228 coordinates between multiple handlers to manage entity relationships and apply changes during replication. The replication engine 228 uses the association handler 232 to manage relationships between entities, such as tag mappings, policy mappings, and grant relationships. The synchronization handler 234 then applies these changes on the secondary system according to the determined dependency order.

In some examples, the association handler 232 manages cross-cutting relationships like tag mappings and policy mappings that span across different entities. The association handler 232 coordinates with the synchronization handler 234 to ensure that associated entities are properly linked during replication. This includes managing parent-child relationships, nested relationships, and other types of associations between entities.

In additional examples, the handlers work together to maintain consistency while processing entities according to their dependencies. The association handler 232 manages the batched discovery and processing of related entities, while the synchronization handler 234 ensures proper ordering when applying changes to maintain referential integrity. The handlers validate entity relationships and manage the creation order to preserve the dependency structure during replication.

In some examples, the synchronization handler 234 validates entity relationships and dependencies during parallel processing to maintain data consistency. When processing entities in parallel, the synchronization handler 234 monitors the completion of dependent operations to ensure that all prerequisites are met before processing dependent entities. The synchronization handler 234 also manages system resources by adjusting batch sizes and parallelization levels based on available computing resources and memory constraints.

In some examples, the synchronization handler 234 manages the staged initialization process for circular dependencies by first initializing basic attributes, then handling referential attributes in subsequent passes. For example, the synchronization handler 234 manages circular dependencies through a staged initialization process that separates the initialization of basic attributes from referential attributes. The synchronization handler 234 first initializes only the basic attributes of a first entity that do not have dependencies on other entities. After initializing the basic attributes of the first entity, the synchronization handler 234 proceeds to initialize both the basic attributes and referential attributes of a second entity, where the referential attributes can now reference the initialized basic attributes from the first entity. This staged approach allows the synchronization handler 234 to establish the foundational attributes before creating the interdependent relationships between entities.

In some examples, the replication engine 228 performs a process of parameter negotiation between a primary system and a secondary system where parameters control replication behavior on both sides. The replication engine 228 parameter values and will not replicate entities if a parameter is turned off on either side. The replication engine 228 includes parameter negotiation for cases where:

- Primary systems and secondary systems are on different versions
- Primary systems and secondary systems have incompatible parameter values for the same feature
- Entity types need to be skipped or don't support replication The replication engine 228 validates feature configurations by checking parameters that control replication behavior. This validation helps catch issues where an entity was not properly snapshotted but had its sync initiated by another feature accidentally. The replication engine 228 uses negotiated parameters to determine whether to use new interfaces for snapshotting and synchronizing instances of different entity types.

In some examples, the replication engine 228 validates that parameters controlling replication behavior are properly configured on both sides before proceeding with replication.

In some examples, the snapshot handler 230 manages operations on the primary system by capturing snapshot data and managing state transitions during the snapshot process. The synchronization handler 234 manages operations on the secondary system by applying changes and maintaining consistency during synchronization. For example, the snapshot handler 230 works with the association handler 232 to identify and capture both primary entities and their associated relationships on the primary system. The synchronization handler 234 then manages the application of these changes on the secondary system according to the determined dependency order.

In some examples, the association handler 232 manages different types of relationships between entities during the replication process. For example, the association handler 232 manages tag mappings by identifying and capturing relationships between entities and their associated tags. The association handler 232 coordinates with the snapshot handler 230 to capture tag associations on the primary system and works with the synchronization handler 234 to properly replicate these relationships on the secondary system. In some examples, the association handler 232 manages policy mappings by handling the relationships between entities and their associated policies. The association handler 232 maintains consistency of policy associations during replication by coordinating the capture and synchronization of policy mapping relationships between primary and secondary systems. The handler validates that policy mappings are properly synchronized according to the dependency structure. In additional examples, the association handler 232 manages grant relationships by capturing and replicating permissions and access controls between entities. The association handler 232 works with other components to maintain proper authorization relationships during replication while preserving the security model across primary and secondary systems. The association handler 232 coordinates with the snapshot handler 230 and the synchronization handler 234 to ensure grant relationships are properly captured and applied in the correct order based on entity dependencies.

In some examples, the replication engine 228 tracks replication metrics to monitor the progress and performance of replication operations. For example, the replication engine 228 tracks metrics such as time spent per domain and counts of created, updated, and deleted entities per domain. The replication engine 228 uses these metrics to monitor the progress of replication operations and validate that entities are properly synchronized according to their dependencies. In some examples, the replication engine 228 validates replication completion by checking the tracked metrics against expected outcomes. The replication engine 228 verifies that entities have been properly replicated and that the synchronization order has been maintained according to the dependency graph. The replication engine 228 also validates that circular dependencies were properly resolved through the staged initialization process. In additional examples, the replication engine 228 coordinates with other components like the snapshot handler 230 and synchronization handler 234 to track metrics across both primary and secondary systems. The replication engine 228 validates replication completion by ensuring entities were properly captured in snapshots and synchronized according to the determined dependency order while maintaining proper relationships between entities.

In some examples, the replication engine 228 handles non-parent-child relationships through multiple coordinated operations. For example, the replication engine 228 provides for automated or manual discovery processes and snapshot operations on the primary system by coordinating between the snapshot handler 230 and the association handler 232. The handlers work together to identify and capture both primary entities and their associated relationships, including tags, policies, and grants. In some examples, the replication engine 228 manages serialization and deserialization of entities for moving data between primary and secondary systems. The replication engine 228 implements specialized interfaces for different types of associated entities, including tag mappings, policy mappings, and grant relationships. This allows the replication engine 228 to manage the unique constraints of each replicated entity type while maintaining consistency. In additional examples, the replication engine 228 coordinates sync-side logic through the synchronization handler 234 to create and update associated entities at the right time on the secondary system. The replication engine 228 processes associated entities to maintain proper ordering and dependencies, ensuring associated entities are synchronized after their primary entities are established but before dependent relationships are created. In some examples, the replication engine 228 supports two-pass processing when needed, allowing for initialization of basic attributes before establishing cross-entity relationships.

In some examples, the replication engine 228 implements separate snapshot writing methods to handle both database-scoped and account-scoped entities. For example, the replication engine 228 coordinates with the snapshot handler 230 to manage snapshot writing operations for different entity scopes. The replication engine 228 supports separate methods for database-scoped entities like schemas and tables versus account-scoped entities like roles and user accounts. In some examples, the replication engine 228 implements specialized snapshot writing methods through the snapshot handler 230 to handle the unique constraints of different entity scopes. For database-scoped entities, the handler uses database snapshot writers to capture entity states and relationships within database contexts. For account-scoped entities, the handler uses account snapshot writers to capture entity states and relationships at the account level. In additional examples, the replication engine 228 coordinates between multiple handlers to maintain proper scoping during snapshot operations. The snapshot handler 230 works with the association handler 232 to capture both database-scoped and account-scoped relationships, while ensuring proper handling of cross-scope dependencies. The handlers implement separate finalization methods for database and account snapshots to properly clean up resources after snapshot completion.

In some examples, the replication engine 228 performs validation operations to ensure complete processing of entities during synchronization. For example, the replication engine 228 validates that all entities in the snapshot have been properly processed after synchronization completes. The replication engine 228 tracks the processing status of entities and performs validation checks to ensure no entities remain unprocessed in the snapshot. In some examples, the replication engine 228 implements validation through the synchronization handler 234, which asserts that there are no unprocessed entities left in the snapshot after synchronization has finished. In some examples, some entities perform custom assertions, in which case they return false for supports standard asserts and do their asserting at the end of their synchronizations. In additional examples, the replication engine 228 performs cleanup operations only after confirming that no unprocessed entities remain in the snapshot.

In some examples, the replication engine 228 manages feature-specific configurations through multiple coordinated operations. For example, the replication engine 228 handles feature-specific configurations by enabling features to implement interfaces that specify their replication behavior. The replication engine 228 processes interface implementations that provide metadata about entity relationships and dependencies that must be maintained during replication. In some examples, the replication engine 228 manages feature configurations through parameter negotiation between primary and secondary systems. The replication engine 228 validates feature configurations by checking parameters that control replication behavior on both sides, ensuring that parameters are properly configured before proceeding with replication operations. The replication engine 228 can use negotiated parameters to determine whether to use new interfaces for snapshotting and synchronizing instances of different entity types. In additional examples, the replication engine 228 coordinates feature-specific configurations through specialized handlers. The snapshot handler 230 manages primary-side operations according to feature configurations, the association handler 232 manages relationship configurations between entities, and the synchronization handler 234 manages secondary-side operations based on feature-specific settings. The replication engine 228 validates that feature configurations are properly maintained throughout the replication process, including handling cases where primary and secondary systems have incompatible parameter values for the same feature.

Figure 5:
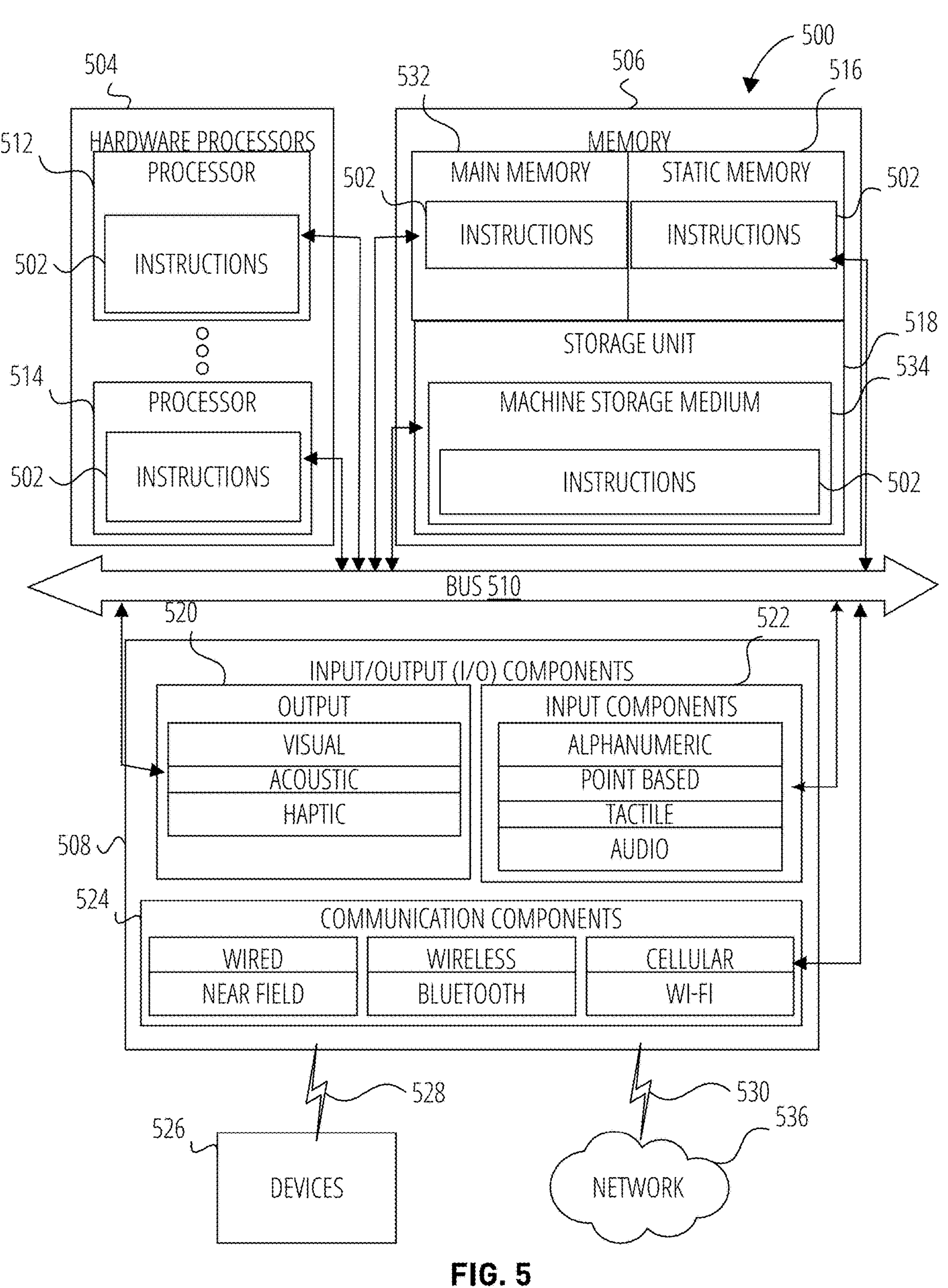
FIG. 5 illustrates a diagrammatic representation of a machine in the form of a computer system within which a set of instructions may be executed for causing the machine to perform any one or more of the methodologies discussed herein, according to some examples.

FIG. 5 illustrates a diagrammatic representation of a machine 500 in the form of a computer system within which a set of instructions may be executed for causing the machine 500 to perform any one or more of the methodologies discussed herein, according to examples. Specifically, FIG. 5 shows a diagrammatic representation of the machine 500 in the example form of a computer system, within which instructions 502 (e.g., software, a program, an application, an applet, an application, or other executable code) for causing the machine 500 to perform any one or more of the methodologies discussed herein may be executed. For example, the instructions 502 may cause the machine 500 to execute any one or more operations of any one or more of the methods described herein. In this way, the instructions 502 transform a general, non-programmed machine into a particular machine 500 (e.g., the compute service manager 104, the execution platform 110, and the data storage devices 108-1 to 108-N of data storage system 106) that is specially configured to carry out any one of the described and illustrated functions in the manner described herein.

In alternative examples, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 502, sequentially or otherwise, that specify actions to be taken by the machine 500. Further, while only a single machine 500 is illustrated, the term "machine" shall also be taken to include a collection of machines that individually or jointly execute the instructions 502 to perform any one or more of the methodologies discussed herein.

The machine 500 includes hardware processors 504, memory 506, and I/O components 508 configured to communicate with each other such as via a bus 510. In some examples, the hardware processors 504 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another hardware processor, or any suitable combination thereof) may include, for example, multiple processors as exemplified by processor 512 and a processor 514 that may execute the instructions 502. The term "processor" is intended to include multi-core processors that may comprise two or more independent processors (sometimes referred to as "cores") that may execute instructions 502 contemporaneously. Although FIG. 5 shows multiple hardware processors 504, the machine 500 may include a single processor with a single core, a single processor with multiple cores (e.g., a multi-core processor), multiple processors with a single core, multiple processors with multiple cores, or any combination thereof.

The memory 506 may include a main memory 532, a static memory 516, and a storage unit 518 including a machine storage medium 534, accessible to the hardware processors 504 such as via the bus 510. The main memory 532, the static memory 516, and the storage unit 518 store the instructions 502 embodying any one or more of the methodologies or functions described herein. The instructions 502 may also reside, completely or partially, within the main memory 532, within the static memory 516, within the storage unit 518, within at least one of the hardware processors 504 (e.g., within the processor's cache memory), or any suitable combination thereof, during execution thereof by the machine 500.

The input/output (I/O) components 508 include components to receive input, provide output, produce output, transmit information, exchange information, capture measurements, and so on. The specific I/O components 508 that are included in a particular machine 500 will depend on the type of machine. For example, portable machines such as mobile phones will likely include a touch input device or other such input mechanisms, while a headless server machine will likely not include such a touch input device. It will be appreciated that the I/O components 508 may include many other components that are not shown in FIG. 5. The I/O components 508 are grouped according to functionality merely for simplifying the following discussion and the grouping is in no way limiting. In various examples, the I/O components 508 may include output components 520 and input components 522. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 522 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 508 may include communication components 524 operable to couple the machine 500 to a network 536 or devices 526 via a coupling 530 and a coupling 528, respectively. For example, the communication components 524 may include a network interface component or another suitable device to interface with the network 536. In further examples, the communication components 524 may include wired communication components, wireless communication components, cellular communication components, and other communication components to provide communication via other modalities. The devices 526 may be another machine or any of a wide variety of peripheral devices (e.g., a peripheral device coupled via a universal serial bus (USB)). For example, as noted above, the machine 500 may correspond to any one of the compute service manager 104, the execution platform 110, and the devices 526 may include the data storage device 226 or any other computing device described herein as being in communication with the data platform 102 or the data storage system 106.

The various memories (e.g., 506, 516, 532, and/or memory of the processor(s) 504 and/or the storage unit 518) may store one or more sets of instructions 502 and data structures (e.g., software) embodying or utilized by any one or more of the methodologies or functions described herein. These instructions 502, when executed by the processor(s) 504, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 536 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 536 or a portion of the network 536 may include a wireless or cellular network, and the coupling 530 may be a Code Division Multiple Access (CDMA) connection, a Global System for Mobile communications (GSM) connection, or another type of cellular or wireless coupling. In this example, the coupling 530 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 502 may be transmitted or received over the network 536 using a transmission medium via a network interface device (e.g., a network interface component included in the communication components 524) and utilizing any one of a number of well-known transfer protocols (e.g., hypertext transfer protocol (HTTP)). Similarly, the instructions 502 may be transmitted or received using a transmission medium via the coupling 528 (e.g., a peer-to-peer coupling) to the devices 526. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 502 for execution by the machine 500, and include digital or analog communications signals or other intangible media to facilitate communication of such instructions 502. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Described implementations of the subject matter can include one or more features, alone or in combination as illustrated below by way of example.

Example 1 is a machine-implemented method, comprising: receiving a set of interface implementations from a set of features in a distributed data platform, each interface implementation of the set of interface implementations providing a set of replication constraints; constructing a dependency graph based on relationships between the set of features using the set of replication constraints; determining a synchronization order for a set of replication operations using the dependency graph; and executing the set of replication operations according to the determined synchronization order.

In Example 2, the subject matter of Example 1 includes, wherein an interface implementation of the set of interface implementations comprise: a set of entity type definitions; and a set of dependency declarations.

In Example 3, the subject matter of any of Examples 1-2 includes, wherein constructing the dependency graph comprises: identifying a set of dependencies declared in the set of interface implementations; identifying a set of parent-child relationships using the set of dependencies; and detecting a set of nested relationships using the set of parent-child relationships.

In Example 4, the subject matter of any of Examples 1-3 includes, wherein determining the synchronization order comprises performing topological sorting of the dependency graph.

In Example 5, the subject matter of any of Examples 1~4 includes, wherein the topological sorting of the dependency graph comprises: grouping entities of the dependency graph that exhibit the same replication behavior into a replicated entity type group; building a list of incoming and outgoing dependencies for each replicated entity type group; assigning assigned priorities to different edge types in the dependency graph using the list of incoming and outgoing dependencies; and resolving cyclic dependencies by delaying processing of edges to subsequent processing passes using the assigned priorities.

In Example 6, the subject matter of any of Examples 1-5 includes, wherein assigning assigned priorities comprises: assigning a parent-child relationship a first priority; assigning a container-nested relationship a second priority; and assigning an associated entity relationship to a third priority.

In Example 7, the subject matter of any of Examples 1-6 includes, wherein executing a replication operation of the set of replication operations comprises: capturing snapshot data through a snapshot handler; managing cross-cutting relationships through an association handler; and controlling synchronization through a synchronization handler.

In Example 8, the subject matter of any of Example 7 includes, determining batch sizes for replication operations based on system resources; and grouping similar entity types for batch processing.

In Example 9, the subject matter of any of Example 8 includes, wherein determining batch sizes comprises: evaluating system resource availability; and adjusting the batch sizes dynamically.

In Example 10, the subject matter of any of Examples 1-9 includes, tracking replication metrics; and validating replication completion using the replication metrics.

In Example 11, the subject matter of any of Examples 1-10 includes, wherein the controlling synchronization comprises: validating entity relationships; and managing entity creation order.

In Example 12, the subject matter of Examples 1-11 includes, negotiating a set of parameters between a primary system and a set of secondary systems; and validating feature configurations using the set of parameters.

In Example 13, the subject matter of any of Examples 1-12 includes, wherein the snapshot handler manages primary-side operations and the synchronization handler manages secondary-side operations.

In Example 14, the subject matter of any of Examples 1-13 includes, wherein the association handler manages: tag mappings; policy mappings; and grant relationships.

In Example 15, the subject matter of any of Examples 1-14 includes, tracking replication metrics; and validating replication completion using the replication metrics.

Example 16 is at least one machine-readable medium including instructions that, when executed by processing circuitry, cause the processing circuitry to perform operations to implement any of Examples 1-15.

Example 17 is an apparatus comprising means to implement any of Examples 1-15.

Example 18 is a system to implement any of Examples 1-15.

Example 19 is a method to implement any of Examples 1-15.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

What is claimed is:

1. A machine-implemented method, comprising:

receiving an interface implementation from a feature in a distributed data platform, the feature implementing the interface implementation, the interface implementation providing a set of replication constraints for the feature, the set of replication constraints comprising a set of entity type definitions and a set of dependency declarations that specify relationships between entity types of the feature;

constructing, by a dependency graph generator, a dependency graph based on relationships of the feature using the set of replication constraints by processing metadata from the interface implementation to identify parent-child relationships, nested relationships, and associated entity relationships between the entity types;

determining a synchronization order for a set of replication operations using the dependency graph by performing a topological sorting of the dependency graph by assigning priorities to different edge types in the dependency graph and resolving cyclic dependencies by delaying processing of edges to subsequent processing passes using the assigned priorities; and executing the set of replication operations according to the determined synchronization order by coordinating between a snapshot handler capturing snapshot data from a primary system and a synchronization handler applying changes to a secondary system to maintain consistency between the primary system and the secondary system during replication.

2. The machine-implemented method of claim 1, wherein the topological sorting of the dependency graph further comprises:

grouping entities of the dependency graph that exhibit a same replication behavior into a replicated entity type group;

building a list of incoming and outgoing dependencies for each replicated entity type group;

assigning assigned priorities to different edge types in the dependency graph using the list of incoming and outgoing dependencies; and resolving cyclic dependencies by delaying processing of edges to subsequent processing passes using the assigned priorities.

3. The machine-implemented method of claim 2, wherein assigning assigned priorities comprises:

assigning a parent-child relationship a first priority;

assigning a container-nested relationship a second priority; and assigning an associated entity relationship to a third priority.

4. The machine-implemented method of claim 1, wherein executing a replication operation of the set of replication operations comprises:

capturing snapshot data through a snapshot handler;

managing cross-cutting relationships through an association handler; and controlling synchronization through a synchronization handler.

5. The machine-implemented method of claim 4, further comprising:

determining batch sizes for replication operations based on system resources; and grouping similar entity types for batch processing.

6. The machine-implemented method of claim 5, wherein determining batch sizes comprises:

evaluating system resource availability; and adjusting the batch sizes dynamically.

7. The machine-implemented method of claim 1, further comprising:

tracking replication metrics; and validating replication completion using the replication metrics.

8. The machine-implemented method of claim 1, further comprising:

negotiating a set of parameters between the primary system and the secondary system before executing the set of replication operations, the negotiating comprising validating that parameters controlling replication behavior are configured on both the primary system and the secondary system; and withholding replication of an entity responsive to determining that a parameter controlling replication behavior for the entity is disabled on the primary system or the secondary system.

9. The machine-implemented method of claim 1, wherein resolving the cyclic dependencies comprises performing a staged initialization process comprising:

initializing basic attributes of a first entity of a cyclic dependency, the basic attributes not having dependencies on other entities;

initializing basic attributes and referential attributes of a second entity of the cyclic dependency, the referential attributes of the second entity referencing the initialized basic attributes of the first entity; and establishing referential attributes of the first entity that reference the initialized basic attributes of the second entity.

10. A system comprising:

at least one processor; and at least one memory storing instructions that, when executed by the at least one processor, cause the system to perform operations comprising:

receiving an interface implementation from a feature in a distributed data platform, the feature implementing the interface implementation, the interface implementation providing a set of replication constraints for the feature, the set of replication constraints comprising a set of entity type definitions and a set of dependency declarations that specify relationships between entity types of the feature;

constructing a dependency graph based on relationships of the feature using the set of replication constraints by processing metadata from the interface implementation to identify parent-child relationships, nested relationships, and associated entity relationships between the entity types;

determining a synchronization order for a set of replication operations using the dependency graph by performing a topological sorting of the dependency graph by assigning priorities to different edge types in the dependency graph and resolving cyclic dependencies by delaying processing of edges to subsequent processing passes using the assigned priorities; and executing the set of replication operations according to the determined synchronization order by coordinating between a snapshot handler capturing snapshot data from a primary system and a synchronization handler applying changes to a secondary system to maintain consistency between the primary system and the secondary system during replication.

11. The system of claim 10, wherein the topological sorting of the dependency graph further comprises:

grouping entities of the dependency graph that exhibit a same replication behavior into a replicated entity type group;

building a list of incoming and outgoing dependencies for each replicated entity type group;

assigning assigned priorities to different edge types in the dependency graph using the list of incoming and outgoing dependencies; and resolving cyclic dependencies by delaying processing of edges to subsequent processing passes using the assigned priorities.

12. The system of claim 11, wherein assigning assigned priorities comprises:

assigning a parent-child relationship a first priority;

assigning a container-nested relationship a second priority; and assigning an associated entity relationship to a third priority.

13. The system of claim 10, wherein executing a replication operation of the set of replication operations comprises:

capturing snapshot data through a snapshot handler;

managing cross-cutting relationships through an association handler; and controlling synchronization through a synchronization handler.

14. The system of claim 13, wherein the operations further comprise:

adjusting batch sizes dynamically by performing operations comprising:

generating a grouping of similar entity types for batch processing;

evaluating system resource availability; and determining the batch sizes for replication operations based on the system resource availability and the grouping.

15. The system of claim 10, wherein the operations further comprise:

tracking replication metrics; and validating replication completion using the replication metrics.

16. The system of claim 10, wherein the operations further comprise:

negotiating a set of parameters between the primary system and the secondary system before executing the set of replication operations, the negotiating comprising validating that parameters controlling replication behavior are configured on both the primary system and the secondary system; and withholding replication of an entity responsive to determining that a parameter controlling replication behavior for the entity is disabled on the primary system or the secondary system.

17. The system of claim 10, wherein resolving the cyclic dependencies comprises performing a staged initialization process comprising:

initializing basic attributes of a first entity of a cyclic dependency, the basic attributes not having dependencies on other entities;

initializing basic attributes and referential attributes of a second entity of the cyclic dependency, the referential attributes of the second entity referencing the initialized basic attributes of the first entity; and establishing referential attributes of the first entity that reference the initialized basic attributes of the second entity.

18. A machine-storage medium storing instructions that, when executed by one or more processors of a system, cause the system to perform operations comprising:

receiving an interface implementation from a feature in a distributed data platform, the feature implementing the interface implementation, the interface implementation providing a set of replication constraints for the feature, the set of replication constraints comprising a set of entity type definitions and a set of dependency declarations that specify relationships between entity types of the feature;

constructing a dependency graph based on relationships of the feature using the set of replication constraints by processing metadata from the interface implementation to identify parent-child relationships, nested relationships, and associated entity relationships between the entity types;

determining a synchronization order for a set of replication operations using the dependency graph by performing a topological sorting of the dependency graph by assigning priorities to different edge types in the dependency graph and resolving cyclic dependencies by delaying processing of edges to subsequent processing passes using the assigned priorities; and executing the set of replication operations according to the determined synchronization order by coordinating between a snapshot handler capturing snapshot data from a primary system and a synchronization handler applying changes to a secondary system to maintain consistency between the primary system and the secondary system during replication.

19. The machine-storage medium of claim 18, wherein the operations further comprise:

negotiating a set of parameters between the primary system and the secondary system before executing the set of replication operations, the negotiating comprising validating that parameters controlling replication behavior are configured on both the primary system and the secondary system; and withholding replication of an entity responsive to determining that a parameter controlling replication behavior for the entity is disabled on the primary system or the secondary system.

20. The machine-storage medium of claim 18, wherein resolving the cyclic dependencies comprises performing a staged initialization process comprising:

initializing basic attributes of a first entity of a cyclic dependency, the basic attributes not having dependencies on other entities;

initializing basic attributes and referential attributes of a second entity of the cyclic dependency, the referential attributes of the second entity referencing the initialized basic attributes of the first entity; and establishing referential attributes of the first entity that reference the initialized basic attributes of the second entity.

* * * * *